(12) United States Patent
Tieu Ming Seng

(10) Patent No.: US 12,742,940 B2
(45) Date of Patent: Sep. 22, 2026

(54) 400G SILICON PHOTONIC PACKAGE WITH SELF-ALIGNED FIBER

(71) Applicant: SHUNYUN TECHNOLOGY (ZHONGSHAN) Limited, Zhongshan (CN)

(72) Inventor: Mark Tieu Ming Seng, Guangdong (CN)

(73) Assignee: SHUNYUN TECHNOLOGY (ZHONGSHAN) Limited, Zhongshan (CN)

( * ) Notice: Subject to any disclaimer, the term of this patent is extended or adjusted under 35 U.S.C. 154(b) by 324 days.

(21) Appl. No.: 18/436,086

(22) Filed: Feb. 8, 2024

(65) Prior Publication Data

US 2024/0280766 A1 Aug. 22, 2024

(30) Foreign Application Priority Data

Feb. 17, 2023 (CN) ......................... 202310135494.3

(51) Int. Cl.
*G02B 6/42* (2006.01)

(52) U.S. Cl.
CPC ........... *G02B 6/423* (2013.01); *G02B 6/4268* (2013.01); *G02B 6/4286* (2013.01)

(58) Field of Classification Search
CPC ..... G02B 6/423; G02B 6/4268; G02B 6/4286
See application file for complete search history.

(56) References Cited

U.S. PATENT DOCUMENTS

2006/0291782 A1* 12/2006 Carpenter ............ G02B 6/3636 385/137
2022/0179159 A1* 6/2022 Wu ...................... G02B 6/4204

FOREIGN PATENT DOCUMENTS

CN 101398513 A 4/2009
CN 101533128 A 9/2009
CN 106340803 A 1/2017
CN 215416013 U 1/2022

OTHER PUBLICATIONS

English translation of CN215416013U (Year: 2022).*

* cited by examiner

*Primary Examiner* — Sung H Pak

(57) ABSTRACT

A 400G silicon photonic package with a self-aligned fiber includes a printed circuit board (PCB) base, a photonic integrated circuit (PIC) chip, a fiber array unit (FAU), and a distributed feedback (DFB) laser. The PIC chip is mounted on the PCB base; the DFB laser is provided on the PCB base and located outside the PIC chip; the FAU includes a fixed plate, a transmitting-terminal fiber, and a receiving-terminal fiber; V-shaped grooves are formed at a lower side of the fixed plate; the transmitting-terminal fiber and the receiving-terminal fiber are respectively arranged in the V-shaped grooves; the PIC chip is integrated with a photodiode (PD) and a monitor photo detector (MPD); V-shaped guide grooves are further formed in the PIC chip; the transmitting-terminal fiber and the receiving-terminal fiber are clamped between the V-shaped guide groove and the V-shaped groove.

9 Claims, 10 Drawing Sheets

PRIOR ART FIG. 1

400G SILICON PHOTONIC PACKAGE WITH SELF-ALIGNED FIBER

CROSS REFERENCE TO RELATED APPLICATIONS

The present application claims the benefit of Chinese Patent Application No. 202310135494.3 filed on Feb. 17, 2023, the contents of which are incorporated herein by reference in their entirety.

TECHNICAL FIELD

The present disclosure relates to the technical field of silicon photonic modules, and in particular to a 400G silicon photonic package with a self-aligned fiber.

BACKGROUND

Silicon photonics is intended to integrate an optical component with a digital chip based on a silicon-based process of the digital chip. With a complementary metal oxide semiconductor (CMOS) process of a silicon material, photonic elements such as a laser and a detector, as well as electronic elements, are integrated onto one microchip to realize a higher integration level and a higher transmission rate.

An existing silicon photonic package includes a silicon chip and a photodiode (PD) chip that are separated apart on a printed circuit board (PCB). As shown in PRIOR ART FIG. 1, the silicon chip 1*a* and the PD chip 2*a* are mounted on the PCB 3*a*. Wire bonding is performed. A TX fiber 4*a* (a transmitting-terminal fiber) is coupled to the silicon chip 1*a*, and an RX fiber 5*a* (a receiving-terminal fiber) is coupled to the PD chip 2*a*. A high-precision coupling device is required to cause a high production cost. The silicon chip and the PD chip are two independent chips. In silicon photonic packaging, a receiving terminal and a transmitting terminal are to be coupled separately. In addition, due to a laser integrated onto the silicon chip and a poor heat conductivity of the chip, a gild wire is easily being contacted when a heat conductive sheet is mounted, thus causing scrap of the product.

Therefore, in the existing silicon photonic packaging, the transmitting-terminal fiber and the receiving-terminal fiber are to be coupled separately to cause a low coupling efficiency and a high cost, a heat dissipation effect of the chip is ensured hardly without damaging the gild wire, and a higher integration level of the chip cannot be achieved.

SUMMARY

An objective of the present disclosure is to provide a 400G silicon photonic package with a self-aligned fiber, to solve problems that a transmitting-terminal fiber and a receiving-terminal fiber are to be coupled separately to cause a low coupling efficiency and a high cost, a heat dissipation effect of a chip is ensured hardly without damaging a gild wire, and a higher integration level of the chip cannot be achieved.

The 400G silicon photonic package with a self-aligned fiber provided by the present disclosure employs the following technical solutions:

A 400G silicon photonic package with a self-aligned fiber includes a PCB base, a photonic integrated circuit (PIC) chip, a fiber array unit (FAU), and a distributed feedback (DFB) laser, where the PIC chip is mounted on the PCB base; and the DFB laser is provided on the PCB base and located outside the PIC chip;

the FAU includes a fixed plate, a transmitting-terminal fiber, and a receiving-terminal fiber; a plurality of V-shaped grooves are formed at a lower side of the fixed plate; the plurality of V-shaped grooves are spaced in parallel; and the transmitting-terminal fiber and the receiving-terminal fiber are respectively arranged in the V-shaped grooves;

the PIC chip is integrated with a PD and a monitor photo detector (MPD); a plurality of V-shaped guide grooves are further formed in the PIC chip; the plurality of V-shaped guide grooves are spaced in parallel; the V-shaped guide grooves are respectively opposite to the V-shaped grooves; and the transmitting-terminal fiber and the receiving-terminal fiber are clamped between the V-shaped guide groove and the V-shaped groove;

a first optical waveguide is connected between the DFB laser and the V-shaped guide groove in which the transmitting-terminal fiber is arranged; the MPD is provided on the first optical waveguide; and a second optical waveguide is connected between the PD and the V-shaped guide groove in which the receiving-terminal fiber is arranged; and the PCB base is provided with a through hole outside the PIC chip; a heat conductive substrate is provided in the through hole; the DFB laser is mounted on an upper side of the heat conductive substrate; the DFB laser is electrically connected to the PCB base; and the other side of the heat conductive substrate is attached to a housing.

Further, a side of the fixed plate corresponding to an end of a fiber is provided with an oblique end surface, the oblique end surface is inclined from bottom to top toward a direction away from the end of the fiber, and an inclination angle of the oblique end surface relative to a vertical surface is any angle between 5° and 15°.

Further, the inclination angle of the oblique end surface relative to the vertical surface is 8°, and the oblique end surface is provided with a lapping surface.

Further, the lower side of the fixed plate is provided with a first stepped surface and a second stepped surface; the first stepped surface is lower than the second stepped surface and is arranged in parallel with the second stepped surface; the plurality of V-shaped grooves are formed in the first stepped surface; and the second stepped surface is configured to crimp a fiber covering layer.

Further, an elastic locating member is further provided at the lower side of the fixed plate; the elastic locating member is located at a side of the V-shaped groove away from the end of the fiber; the elastic locating member is provided with a plurality of cutting slits; the cutting slits each are colinear with a corresponding one of the V-shaped grooves; and the cutting slit is configured to clamp the transmitting-terminal fiber or the receiving-terminal fiber.

Further, the elastic locating member is an elastic rubber strip; a cutting direction of the cutting slit is parallel to a length direction of the V-shaped groove; a withstand blind via is formed in a middle of the cutting slit; and an axial direction of the withstand blind via is along a depth direction of the cutting slit.

Further, the first optical waveguide is sequentially provided with a 50%-50% beam splitter, a Mach-Zehnder (MZN) modulator, and a 5%-95% beam splitter along a light emitting direction; the two first optical waveguides are connected to one 50%-50% beam splitter; and the MPD is provided on a branch of the 5%-95% beam splitter.

Further, a focusing lens is further provided between a tail end of the first optical waveguide and the DFB laser.

Further, the heat conductive substrate is a tungsten-copper heat conductive substrate, and includes a bottom plate and a middle boss that are integrated; the middle boss is provided in a middle of an upper side of the bottom plate; an upper surface of the bottom plate is attached to a lower surface of the PCB base; and an upper surface of the middle boss is flush with an upper surface of the PCB base.

Further, the PIC chip is further provided with a wire pad; the wire pad is electrically connected to the PCB base; and an integrated circuit (IC), a gold finger, a resistor, and a capacitor are further mounted on the PCB base.

The present disclosure has the following beneficial effects: The 400G silicon photonic package with a self-aligned fiber uses the PCB base, the PIC chip, the FAU and the DFB laser. The PIC chip is mounted on the PCB base. The transmitting-terminal fiber and the receiving-terminal fiber of the FAU are respectively arranged in the V-shaped grooves of the fixed plate. Accordingly, the PIC chip is provided with a plurality of parallel spaced V-shaped guide grooves. The V-shaped grooves are respectively opposite to the V-shaped grooves. The transmitting-terminal fiber and the receiving-terminal fiber are clamped between the V-shaped guide groove and the V-shaped groove.

The V-shaped groove etched on the fixed plate is used to accurately locate the fiber, thereby ensuring arrangement of a fiber array along a length direction of the V-shaped groove. When the fixed plate is aligned to the PIC chip, even in case of a positional deviation between the fiber array and the V-shaped guide groove, the fiber can be guided through a rabbet of the V-shaped guide groove and a rabbet of the V-shaped groove, thereby automatically adjusting a mounting position of the fiber array. Compared with active coupling in the prior art, the silicon photonic package uses inactive self-aligning coupling to realize integrated coupling for a transmitting terminal and a receiving terminal, with a high coupling efficiency and a lower cost.

Moreover, the first optical waveguide and the second optical waveguide are further provided on the PIC chip. The first optical waveguide is connected between the DFB laser and the V-shaped guide groove in which the transmitting-terminal fiber is arranged. A transmitted optical signal enters the transmitting-terminal fiber through the first optical waveguide. The second optical waveguide is connected between the PD and the V-shaped guide groove in which the receiving-terminal fiber is arranged. A received optical signal enters the PD through the receiving-terminal fiber and the second optical waveguide. Therefore, the received optical signal is converted into a corresponding electrical signal, and a photoelectric signal conversion function and a high-speed data transmission function of the silicon photonic chip are realized.

In addition, the DFB laser is provided on the PCB base and located outside the PIC chip. The heat conductive substrate is provided in the through hole of the PCB base 1. The DFB laser is mounted at the upper side of the heat conductive substrate. The other side of the heat conductive substrate is attached to the housing. Since the heat conductive substrate is provided in the through hole of the PCB base, heat from the DFB laser is directly transferred to the housing through the heat conductive substrate. This achieves a higher heat conductivity and a better heat dissipation effect of the chip, omits a heat conductive sheet on the PIC chip or the PCB base, unnecessarily damages a gild wire to ensure the heat dissipation effect of the chip, and realizes a higher integration level of the chip.

BRIEF DESCRIPTION OF THE DRAWINGS

PRIOR ART

In PRIOR ART FIG. 1: 1*a*: silicon chip, 2*a*: PD chip, 3*a*: PCB, 4*a*: TX fiber, and 5*a*: RX fiber;

In FIG. 2 to FIG. 10: 1: PCB base, 10: through hole, 11: heat conductive substrate, 111: bottom plate, 112: middle boss, 12: IC, 13: gold finger, 14: resistor, and 15: capacitor;

2: PIC chip, 200: V-shaped guide groove, 201: first optical waveguide, 202: second optical waveguide, 21: MPD, 203: rabbet of V-shaped guide groove, 22: PD, 23: 50%-50% beam splitter, 24: MZN modulator, 25: 5%-95% beam splitter, and 26: wire pad;

3: FAU, 30: fixed plate, 300: V-shaped groove, 301: rabbet of V-shaped groove, 302: first stepped surface, 303: second stepped surface, 31: transmitting-terminal fiber, 32: receiving-terminal fiber, 33: oblique end surface, 34: elastic locating member, 340: cutting slit, and 35: withstand blind via; and

4: DFB laser, 5: focusing lens, and 6—housing.

DETAILED DESCRIPTION

The specific implementations of the present disclosure are described in more detail below with reference to the accompanying drawings and embodiments. The following embodiments are intended to illustrate the present disclosure, but not to limit the scope of the present disclosure.

Figure 1:
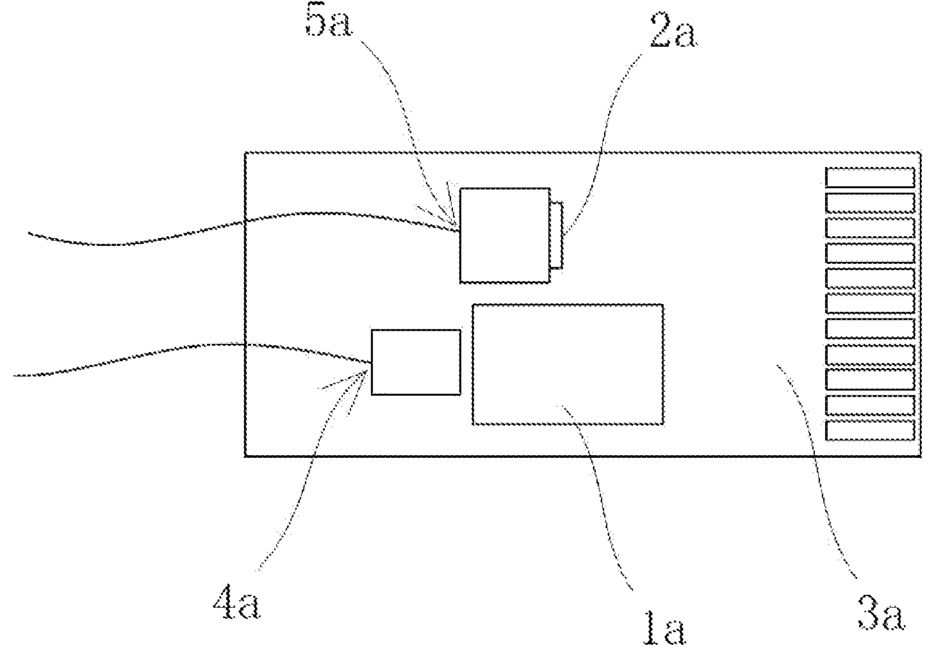
FIG. 1 is a schematic plan of an existing silicon photonic package in BACKGROUND.
Figure 2:
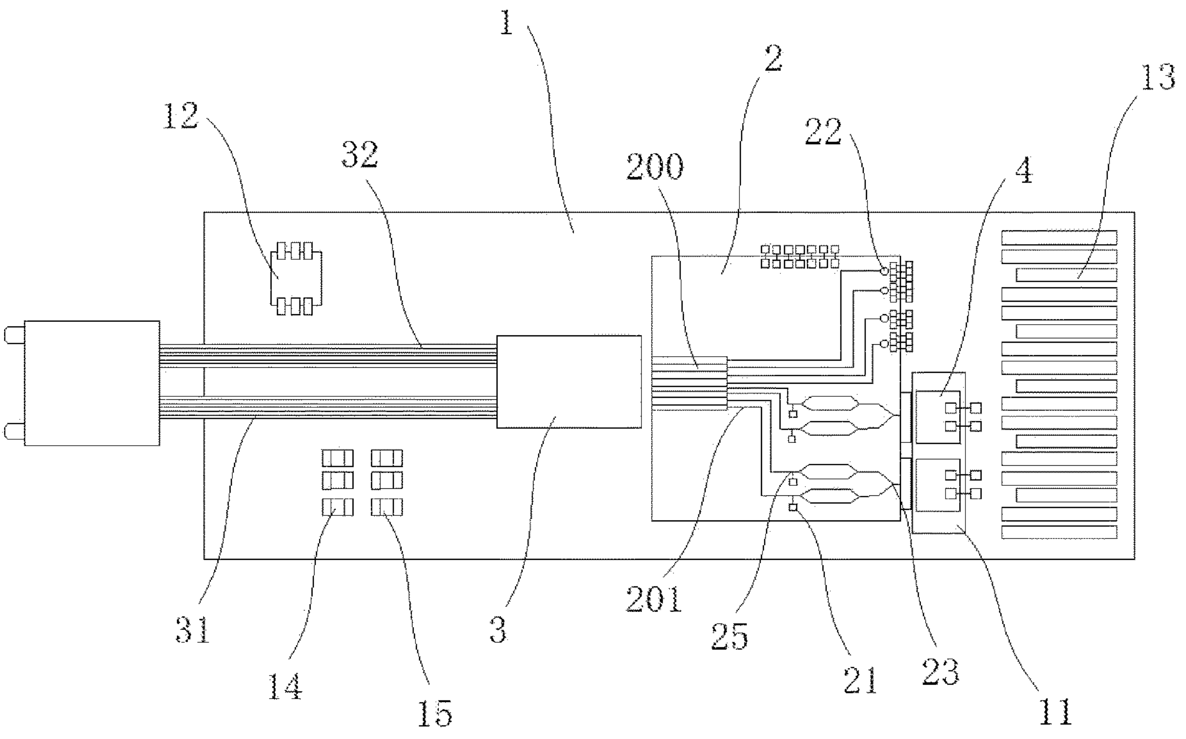
FIG. 2 is a schematic plan of a 400G silicon photonic package in an embodiment of a 400G silicon photonic package with a self-aligned fiber according to the present disclosure.
Figure 3:
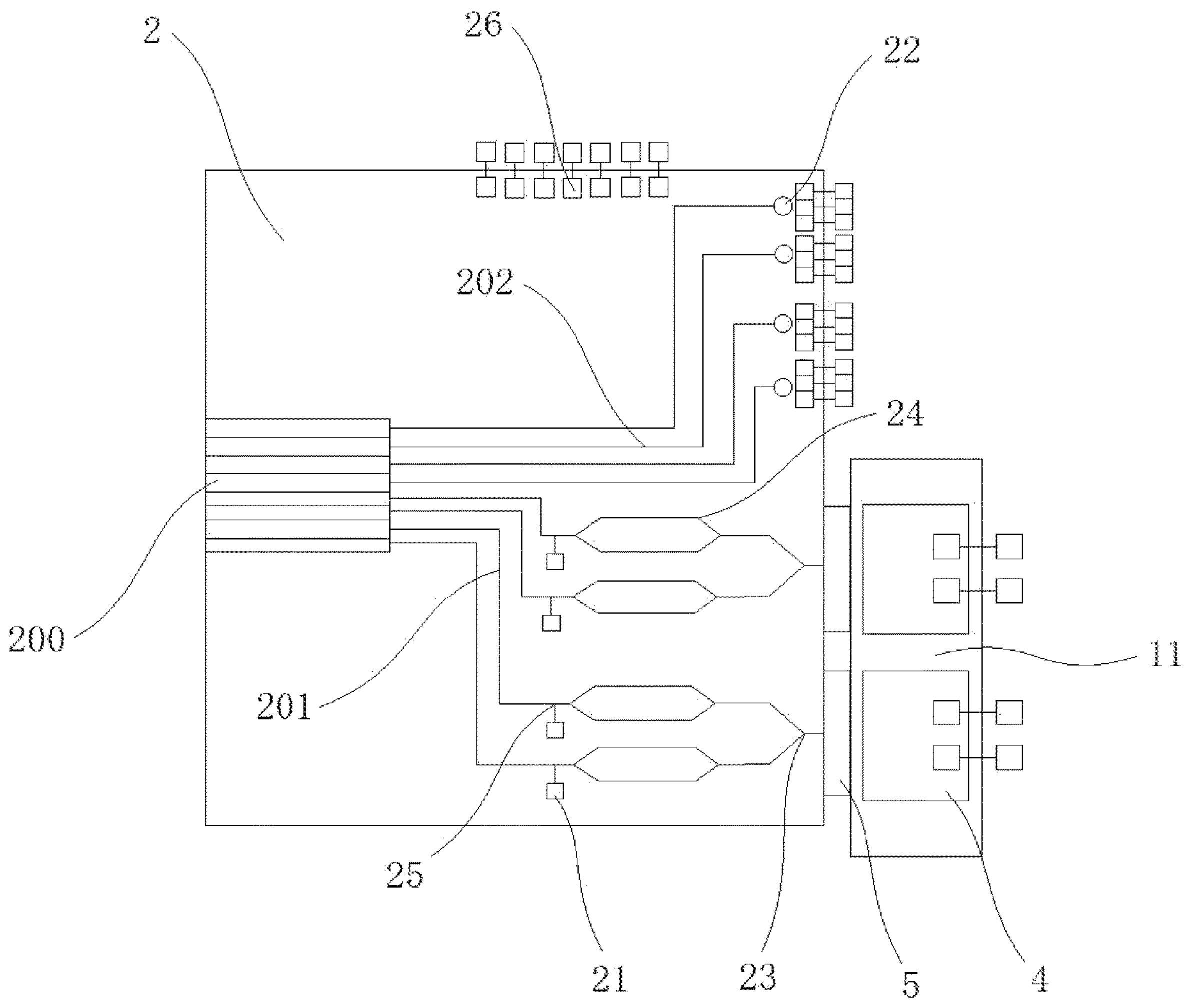
FIG. 3 is a partial enlarged view of the 400G silicon photonic package in FIG. 2.
Figure 4:
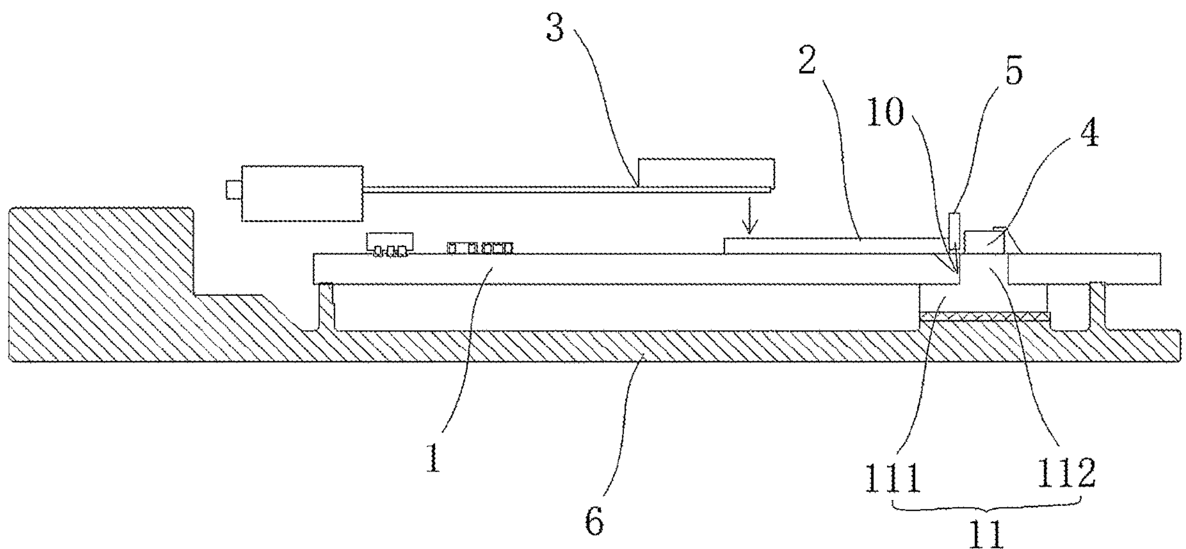
FIG. 4 is a schematic sectional view of the 400G silicon photonic package in FIG. 2.
Figure 5:
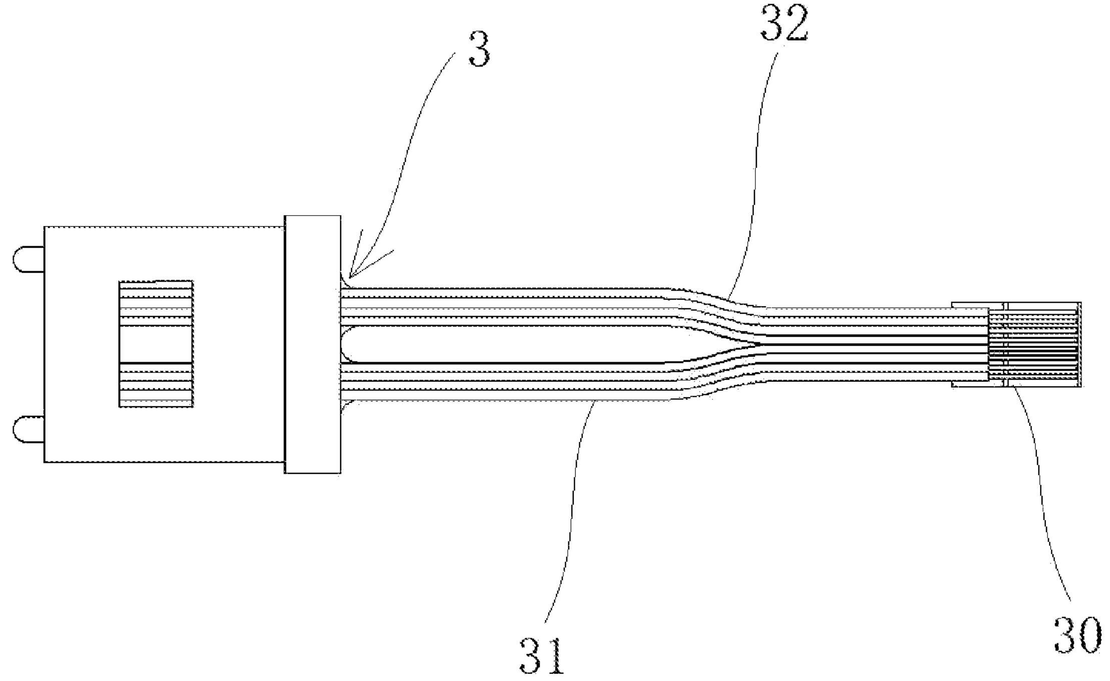
FIG. 5 is a schematic bottom view of an FAU in an embodiment of a 400G silicon photonic package with a self-aligned fiber according to the present disclosure.
Figure 6:
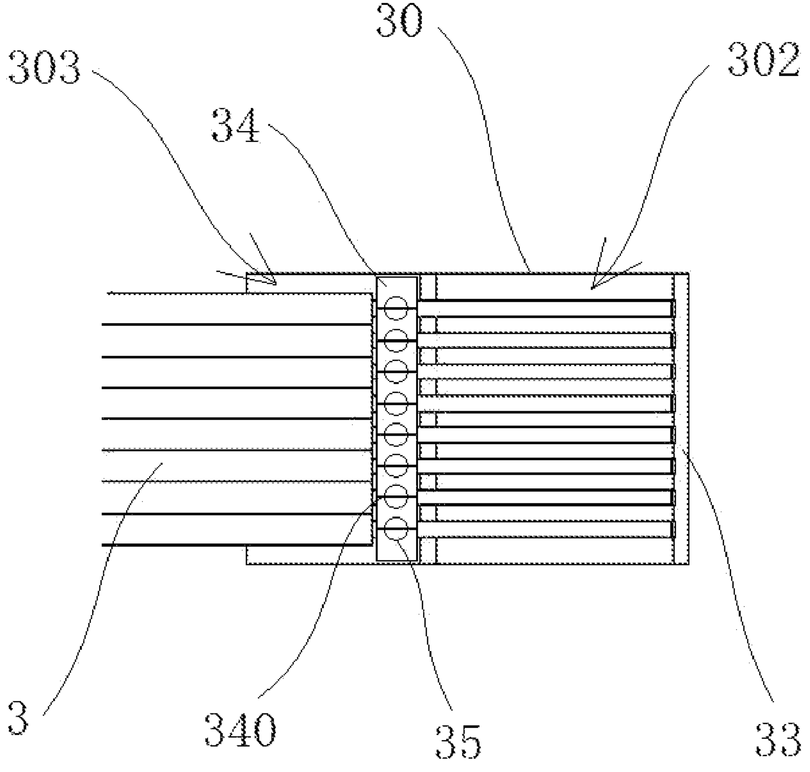
FIG. 6 is a partial enlarged view at a fixed plate in FIG. 5.
Figure 7:
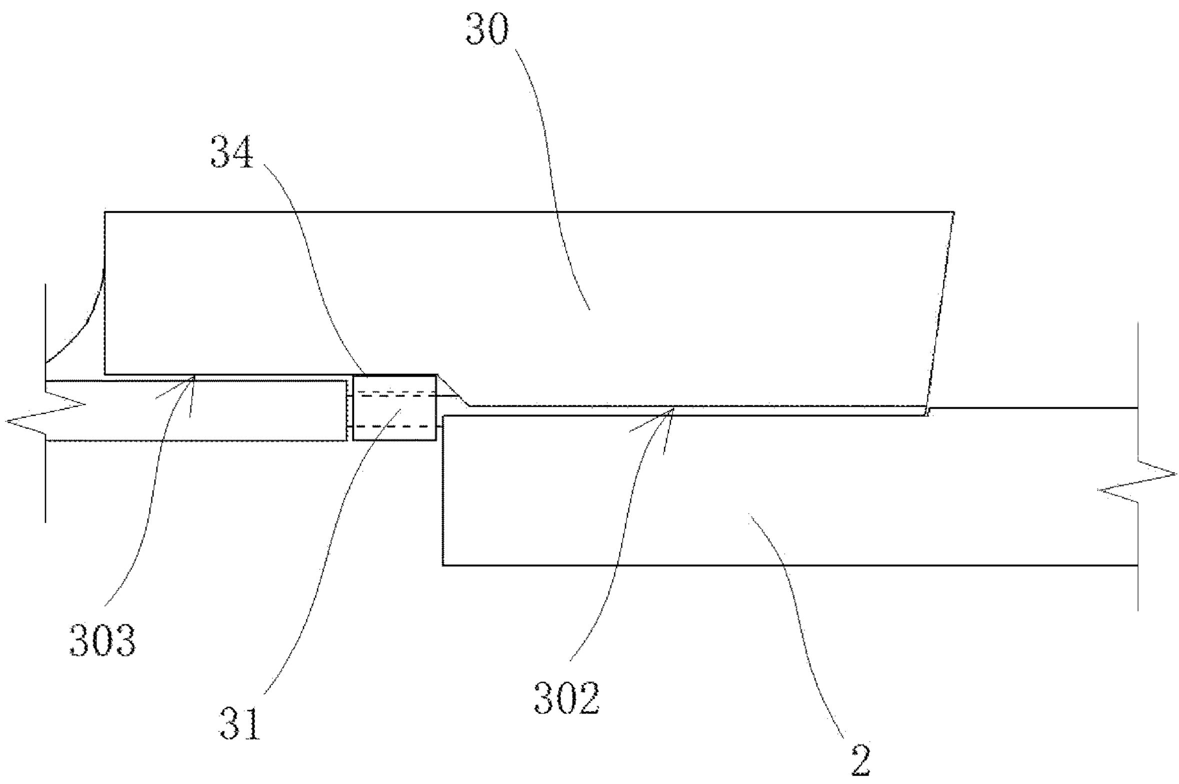
FIG. 7 is a schematic front view of an FAU and a PIC chip in an embodiment of a 400G silicon photonic package with a self-aligned fiber according to the present disclosure.
Figure 8:
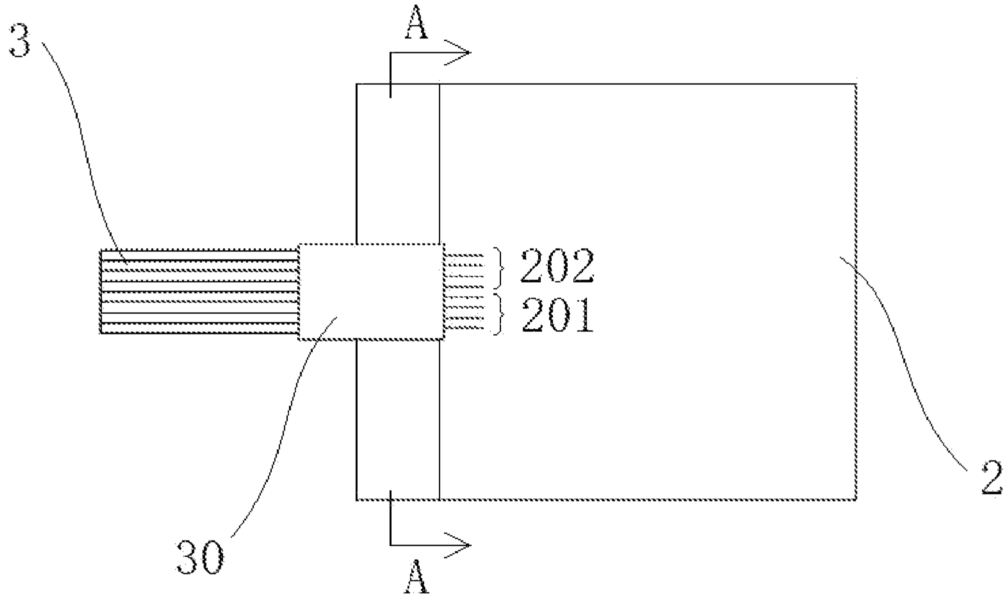
FIG. 8 is a schematic top view of an FAU and a PIC chip in an embodiment of a 400G silicon photonic package with a self-aligned fiber according to the present disclosure.
Figure 9:
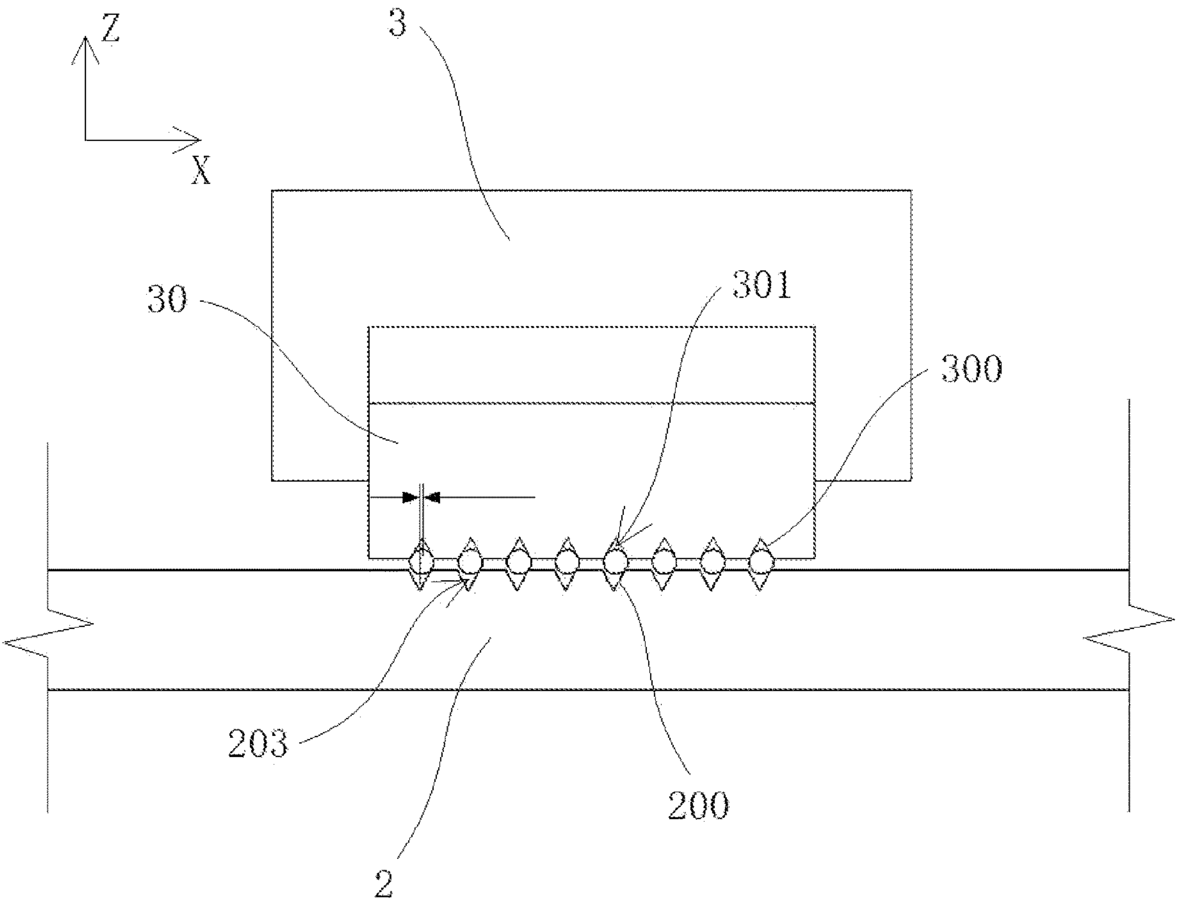
FIG. 9 is a schematic sectional view at A-A when a fiber is not aligned to a V-shaped guide groove in FIG. 8.
Figure 10:
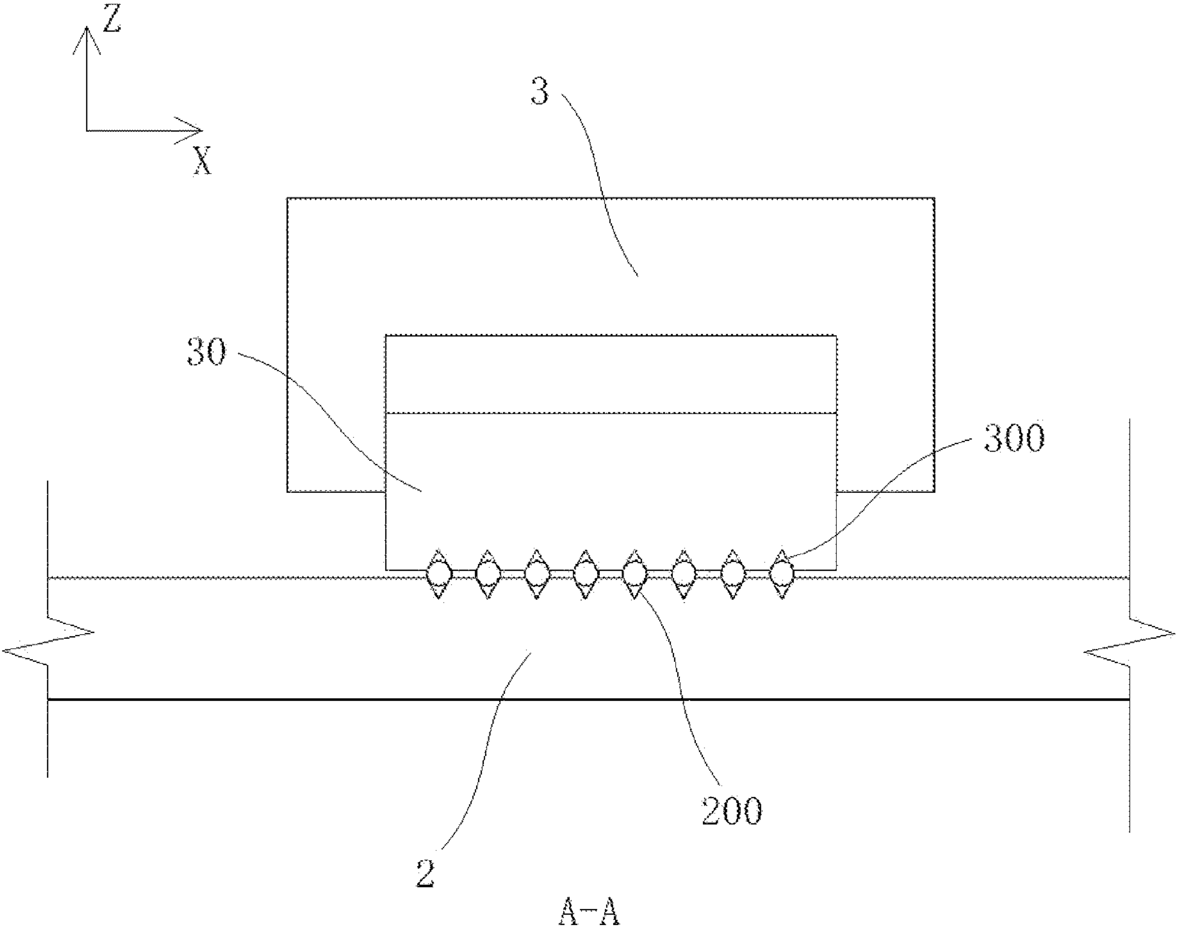
FIG. 10 is a schematic sectional view at A-A when a fiber is aligned to a V-shaped guide groove in FIG. 8.

Specific Embodiment 1 of a 400G silicon photonic package with a self-aligned fiber provided by the present disclosure is as shown in FIG. 2 to FIG. 10. The 400G silicon photonic package with a self-aligned fiber includes a PCB base 1, a PIC chip 2, a fiber array unit 3, and a DFB laser 4. The PIC chip 2 is mounted on the PCB base 1. The DFB laser 4 is provided on the PCB base 1 and located outside the PIC chip 2. The FAU 3 includes a fixed plate 30, a transmitting-terminal fiber 31, and a receiving-terminal fiber 32. A plurality of V-shaped grooves 300 are formed at a lower side of the fixed plate 30. The plurality of V-shaped grooves 300 are spaced in parallel. The transmitting-terminal fiber 31 and the receiving-terminal fiber 32 are respectively arranged in the V-shaped grooves 300.

The PIC chip 2 is integrated with an MPD 21 and a PD 22. A plurality of V-shaped guide grooves 200 are further formed in the PIC chip 2. The plurality of V-shaped guide grooves 200 are spaced in parallel. The V-shaped grooves 300 are respectively vertically opposite to the V-shaped guide grooves 200. The transmitting-terminal fiber 31 and the receiving-terminal fiber 32 are clamped between the V-shaped guide groove 200 and the V-shaped groove 300. A first optical waveguide 201 is connected between the DFB laser 4 and the V-shaped guide groove in which the transmitting-terminal fiber 31 is arranged. The MPD 21 is provided on the first optical waveguide 201. A second optical waveguide 202 is connected between the PD 22 and the V-shaped guide groove in which the receiving-terminal fiber 32 is arranged.

The PCB base 1 is provided with a through hole 10 outside the PIC chip 2. A heat conductive substrate 11 is provided in the through hole 10. The DFB laser 4 is mounted on an upper side of the heat conductive substrate 11. The DFB laser 4 is electrically connected to the PCB base 1. The other side of the heat conductive substrate 11 is attached to a housing 6.

The 400G silicon photonic package with a self-aligned fiber uses the PCB base 1, the PIC chip 2, the FAU 3 and the DFB laser 4. The PIC chip 2 is mounted on the PCB base 1. The transmitting-terminal fiber 31 and the receiving-terminal fiber 32 of the FAU 3 are respectively arranged in the V-shaped grooves 300 of the fixed plate 30. Accordingly, the PIC chip 2 is provided with a plurality of parallel spaced V-shaped guide grooves 200. The V-shaped grooves 300 are respectively opposite to the V-shaped guide grooves 200. The transmitting-terminal fiber 31 and the receiving-terminal fiber 32 are clamped between the V-shaped groove 300 and the V-shaped guide groove 200.

The V-shaped groove 300 etched on the fixed plate 30 is used to accurately locate the fiber, thereby ensuring arrangement of a fiber array along a length direction of the V-shaped groove 300. When the fixed plate 30 is aligned to the PIC chip 2, even in case of a positional deviation (at a margin within 10 μm) between the fiber array and the V-shaped guide groove 200, the fiber can be guided through a rabbet 203 of the V-shaped guide groove and a rabbet 301 of the V-shaped groove, thereby automatically adjusting a mounting position of the fiber array. Compared with active coupling in the prior art, the silicon photonic package uses inactive self-aligning coupling to realize integrated coupling for a transmitting terminal and a receiving terminal, with a high coupling efficiency and a lower cost.

Moreover, the first optical waveguide 201 and the second optical waveguide 202 are further provided on the PIC chip 2. The transmitting-terminal fiber 31 is connected to the DFB laser 4 through the first optical waveguide 201. A transmitted optical signal enters the transmitting-terminal fiber 31 through the first optical waveguide 201. The second optical waveguide 202 is connected between the PD 22 and the V-shaped guide groove in which the receiving-terminal fiber 32 is arranged. A received optical signal enters the PD 22 through the receiving-terminal fiber 32 and the second optical waveguide 202. Therefore, the received optical signal is converted into a corresponding electrical signal, and a photoelectric signal conversion function and a high-speed data transmission function of the silicon photonic chip are realized.

In addition, the DFB laser 4 is provided on the PCB base 1 and located outside the PIC chip 2. The heat conductive substrate 11 is provided in the through hole 10 of the PCB base 1. The DFB laser 4 is mounted at the upper side of the heat conductive substrate 11. The other side of the heat conductive substrate 11 is attached to the housing 6. Since the heat conductive substrate 11 is provided in the through hole 10 of the PCB base 1, heat from the DFB laser 4 is directly transferred to the housing 6 through the heat conductive substrate 11. This achieves a higher heat conductivity and a better heat dissipation effect of the chip, omits a heat conductive sheet on the PIC chip 2 or the PCB base 1, unnecessarily damages a gild wire to ensure the heat dissipation effect of the chip, and realizes a higher integration level of the chip.

As a further preferred solution, a side of the fixed plate 30 corresponding to an end of a fiber is provided with an oblique end surface 33. The oblique end surface 33 is inclined from bottom to top toward a direction away from the end of the fiber. An inclination angle of the oblique end surface 33 relative to a vertical surface is any angle between 5° and 15°. In the embodiment, the inclination angle of the oblique end surface 33 relative to the vertical surface is 8°, and the oblique end surface 33 is provided with a lapping surface. This can reduce a return loss (RL).

Specifically, the lower side of the fixed plate 30 is provided with a first stepped surface 302 and a second stepped surface 303. The first stepped surface 302 is lower than the second stepped surface 303 and is arranged in parallel with the second stepped surface. The plurality of V-shaped grooves 300 are formed in the first stepped surface 302. The second stepped surface 303 is configured to crimp a fiber covering layer. The FAU 3 is an eight-channel quartz FAU. A bare fiber has a diameter of 125 μm. The fiber covering layer has a diameter of 250 μm. There are eight V-shaped grooves 300. The V-shaped grooves corresponding to four transmitting-terminal fibers 31 and the V-shaped grooves corresponding to four receiving-terminal fibers 32 are distributed equidistantly. A spacing between centers of two adjacent ones of the V-shaped grooves 300 is 250 μm. A width of the rabbet 301 of the V-shaped groove 300 is less than the diameter of the bare fiber. Accordingly, there are also eight V-shaped guide grooves 200. A spacing between centers of two adjacent ones of the V-shaped guide grooves 200 is 250 μm.

Moreover, an elastic locating member 34 is further provided at the lower side of the fixed plate 30. The elastic locating member 34 is located at a side of the V-shaped groove 300 away from the end of the fiber. The elastic locating member 34 is provided with a plurality of cutting slits 340. The cutting slits 340 each are colinear with a corresponding one of the V-shaped grooves 300. The cutting slit 340 is configured to clamp the transmitting-terminal fiber 31 or the receiving-terminal fiber 32. As a further preferred solution, the elastic locating member 34 is an elastic rubber strip. A cutting direction of the cutting slit 340 is parallel to a length direction of the V-shaped groove 300. A withstand blind via 35 is formed in a middle of the cutting slit 340. An axial direction of the withstand blind via 35 is along a depth direction of the cutting slit 340, such that a pressing rod can extend into the withstand blind via 35 to press the transmitting-terminal fiber 31 or the receiving-terminal fiber 32 into the corresponding cutting slit 340. With two sidewalls of the cutting slit 340 for clamping and locating the fiber, the fiber is located in the V-shaped groove 300 all the time in assembly to improve an accuracy of the inactive fiber coupling.

In the embodiment, the first optical waveguide 201 is sequentially provided with a 50%-50% beam splitter 23, an MZN modulator 24, and a 5%-95% beam splitter 25 along a light emitting direction. The two first optical waveguides are connected to one 50%-50% beam splitter 23. The MPD 21 is provided on a branch of the 5%-95% beam splitter 25. Moreover, a focusing lens 5 is further provided between a tail end of the first optical waveguide 201 and the DFB laser 4. The x %-(100-x) % beam splitter divides a beam of light into two beams. Light energy of each beam is x % or (100-x) % of light energy of the original beam.

In addition, the heat conductive substrate 11 is a tungsten-copper heat conductive substrate, and includes a bottom plate 111 and a middle boss 112 that are integrated. The middle boss 112 is provided in a middle of an upper side of the bottom plate 111. An upper surface of the bottom plate 111 is attached to a lower surface of the PCB base 1. An upper surface of the middle boss 112 is flush with an upper surface of the PCB base 1. Moreover, a wire pad 26 is further provided on the PIC chip 2. The wire pad 26 is electrically connected to the PCB base 1. An IC 12, a gold finger 13, a resistor 14, and a capacitor 15 are further mounted on the PCB base 1.

The foregoing are merely descriptions of the preferred embodiments of the present disclosure. It should be noted that several improvements and replacements can be made by a person of ordinary skill in the art without departing from the technical principle of the present disclosure, and these improvements and replacements shall also be deemed as falling within the protection scope of the present disclosure.

The invention claimed is:

1. A 400G silicon photonic package with a self-aligned fiber, comprising a printed circuit board (PCB) base, a photonic integrated circuit (PIC) chip, a fiber array unit (FAU), and a distributed feedback (DFB) laser, wherein the PIC chip is mounted on the PCB base; and the DFB laser is provided on the PCB base and located outside the PIC chip;

the FAU comprises a fixed plate, a transmitting-terminal fiber, and a receiving-terminal fiber; a plurality of V-shaped grooves are formed at a lower side of the fixed plate; the plurality of V-shaped grooves are spaced in parallel; and the transmitting-terminal fiber and the receiving-terminal fiber are respectively arranged in the V-shaped grooves;

the PIC chip is integrated with a photodiode (PD) and a monitor photo detector (MPD); a plurality of V-shaped guide grooves are further formed in the PIC chip; the plurality of V-shaped guide grooves are spaced in parallel; the V-shaped guide grooves are respectively opposite to the V-shaped grooves; and the transmitting-terminal fiber and the receiving-terminal fiber are clamped between the V-shaped guide groove and the V-shaped groove;

a first optical waveguide is connected between the DFB laser and the V-shaped guide groove in which the transmitting-terminal fiber is arranged; the MPD is provided on the first optical waveguide; and a second optical waveguide is connected between the PD and the V-shaped guide groove in which the receiving-terminal fiber is arranged; and the PCB base is provided with a through hole outside the PIC chip; a heat conductive substrate is provided in the through hole; the DFB laser is mounted on an upper side of the heat conductive substrate; the DFB laser is electrically connected to the PCB base; and the other side of the heat conductive substrate is attached to a housing;

wherein the lower side of the fixed plate is provided with a first stepped surface and a second stepped surface; the first stepped surface is lower than the second stepped surface and is arranged in parallel with the second stepped surface; the plurality of V-shaped grooves are formed in the first stepped surface; and the second stepped surface is configured to crimp a fiber covering layer.

2. The 400G silicon photonic package with a self-aligned fiber according to claim 1, wherein a side of the fixed plate corresponding to an end of a fiber is provided with an oblique end surface, the oblique end surface is inclined from bottom to top toward a direction away from the end of the fiber, and an inclination angle of the oblique end surface relative to a vertical surface is any angle between 5° and 15°.

3. The 400G silicon photonic package with a self-aligned fiber according to claim 2, wherein the inclination angle of the oblique end surface relative to the vertical surface is 8°, and the oblique end surface is provided with a lapping surface.

4. The 400G silicon photonic package with a self-aligned fiber according to claim 1, wherein an elastic locating member is further provided at the lower side of the fixed plate; the elastic locating member is located at a side of the V-shaped groove away from an end of a fiber; the elastic locating member is provided with a plurality of cutting slits; the cutting slits each are colinear with a corresponding one of the V-shaped grooves; and the cutting slit is configured to clamp the transmitting-terminal fiber or the receiving-terminal fiber.

5. The 400G silicon photonic package with a self-aligned fiber according to claim 4, wherein the elastic locating member is an elastic rubber strip; a cutting direction of the cutting slit is parallel to a length direction of the V-shaped groove; a withstand blind via is formed in a middle of the cutting slit; and an axial direction of the withstand blind via is along a depth direction of the cutting slit.

6. The 400G silicon photonic package with a self-aligned fiber according to claim 1, wherein the first optical waveguide is sequentially provided with a 50%-50% beam splitter, a Mach-Zehnder (MZN) modulator, and a 5%-95% beam splitter along a light emitting direction; the two first optical waveguides are connected to one 50%-50% beam splitter; and the MPD is provided on a branch of the 5%-95% beam splitter.

7. The 400G silicon photonic package with a self-aligned fiber according to claim 1, wherein a focusing lens is further provided between a tail end of the first optical waveguide and the DFB laser.

8. The 400G silicon photonic package with a self-aligned fiber according to claim 1, wherein the heat conductive substrate is a tungsten-copper heat conductive substrate, and comprises a bottom plate and a middle boss that are integrated; the middle boss is provided in a middle of an upper side of the bottom plate; an upper surface of the bottom plate is attached to a lower surface of the PCB base; and an upper surface of the middle boss is flush with an upper surface of the PCB base.

9. The 400G silicon photonic package with a self-aligned fiber according to claim 1, wherein the PIC chip is further provided with a wire pad; the wire pad is electrically connected to the PCB base; and an integrated circuit (IC), a gold finger, a resistor, and a capacitor are further mounted on the PCB base.

* * * * *